July 13, 1926.
C. C. WORTHINGTON
LAWN MOWER CONSTRUCTION
Filed April 8, 1921
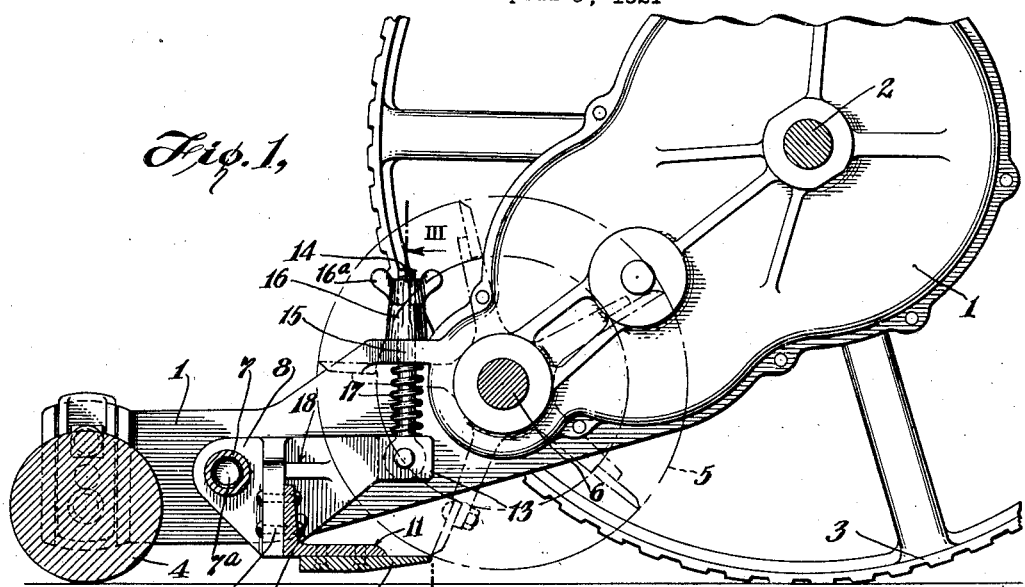
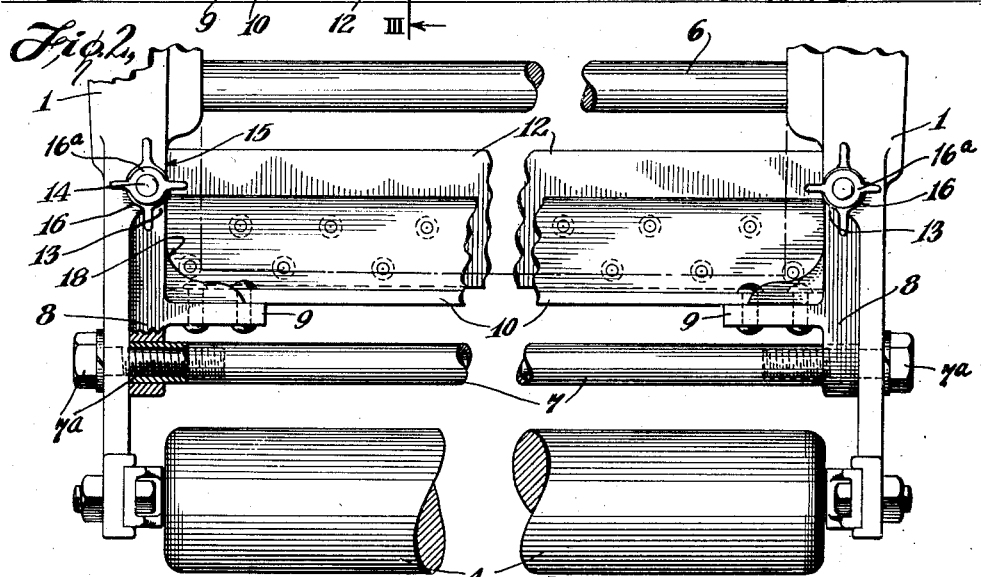
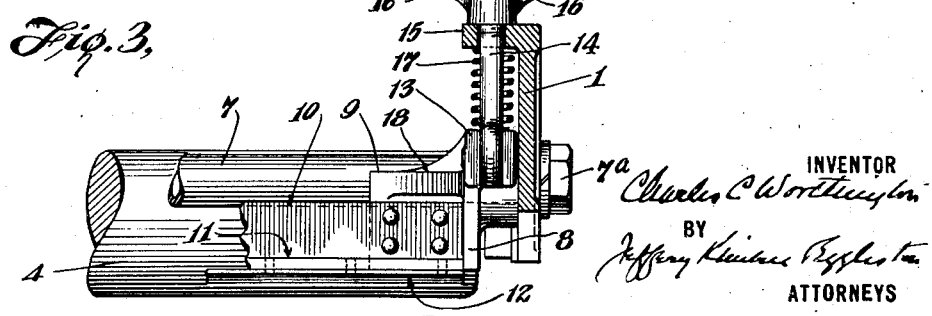
INVENTOR
Charles C. Worthington
BY
Jeffery Kimber Eggleston
ATTORNEYS Patented July 13, 1926.

1,592,588

UNITED STATES PATENT OFFICE.

CHARLES C. WORTHINGTON, OF DUNFIELD, NEW JERSEY.

LAWN-MOWER CONSTRUCTION.

Application filed April 8, 1921. Serial No. 459,725.

The invention relates to lawn mowers of the kind having fixed bed-knives and movable or rotary fly-knives and consists in the fabrication of the bed-knife structure out of separately made parts, such as, angle-irons or bars of standard section, and castings, forgings, or stampings of simple design, all permanently assembled into a composite, rigid bed-knife structure. It is important to the proper action and permanent efficiency of lawn mowers of this class that the bed-knife proper be held upon a bed member which is perfectly and permanently flat or straight and free from tendency to bend or to change its shape, as from warping or otherwise, and no little difficulty has been encountered in securing one-piece castings to conform to this requirement without making them of a weight or shape which, if not prohibitive, is at least out of keeping with the design of the rest of the apparatus. This difficulty is serious in the case of lawn mowers intended to serve as units in gang-lawn-mowers, as in the present case, where each unit is required to cut a very wide swath, say 30 inches, and the permissible weight is prescribed and closely limited by the tractive power available for hauling or propelling the gang. By making the bed-knife structure of separate parts, assembled and rigidly secured together according to the principle of this invention, and as hereinafter pointed out, an adequate cross-section and a very desirable shape of the terminal portions are obtained in a structure which is relatively very light in weight, extremely stiff, and thoroughly proof against warping or distortion. Such a structure is inexpensively produced, as compared with the effort to secure equivalent results by any single-piece iron casting, is susceptible of nicer adjustment, and because of its combined lightness and stiffness gives a longer period of usefulness to the mower as a whole.

The invention further concerns the manner of mounting the bed-knife structure and especially the means of adjusting it to take up wear of the knives, being in this respect particularly adapted for accurate adjustment with the least effort and inconvenience and the greatest permanence as will later appear.

Referring to the single sheet of drawings appended hereto, Figure 1 is a longitudinal vertical section adjacent the side frame member or gear casing of the mower, showing the fabricated bed knife structure in position, various ordinary parts not directly concerned in the invention being omitted.

Figure 2 is a broken out plan of said structure, and Figure 3 is a detail section on line III—III of Figure 1.

In the common type of lawn mower shown, the frame is composed of two side frame members or gear casings 1, rigidly joined by a cross bar 2, and supported in front by the ground wheels 3 and in rear by a roller 4, rotatably and adjustably mounted in the tails of the side casings. The fly knife or cutter reel 5 indicated by the dotted lines (Fig. 1) is carried on the cutter shaft 6 which is located in rear of the ground wheels and driven by a gear train within the side casing as will be understood without description. Instead of this arrangement, the ground wheels might be in rear and the cutter in front. According to the present invention a cross rod 7, which may be a solid bar but is preferably a tube, joins the smaller ends of the side frame members and serves the double function of a rigid connection between the ends of said members and a pivotal support for the bed-knife structure upon which the latter is movable for adjustment. The ends of this rod abut against the inner faces of the side frames and are firmly and permanently fixed thereto by the bolts 7ª screwed into the ends of the rod as indicated in Fig. 2. This forms an adequately strong rear connection for the small ends of the side frame members, it being apparent that the tube 7 can be of any necessary diameter and that its attachment to said members may be re-inforced as desired.

The bed-knife structure is composed of two bracketed end fixtures 8 pivotally mounted upon, or concentric to the cross rod 7 immediately adjacent its attachment to the side frame members 1 and so as to lie against or close to the flat inner faces thereof. Each fixture is provided with an inwardly projecting bracket flange 9 and a rolled angle-iron, which being rolled is very stiff and resistant to warping or equivalently stiff longitudinal bed-plate member 10 is very firmly riveted by each end to these flanges as shown in Fig. 2, so that its bottom flange 11 projects forwardly and serves as a flat bed surface to receive and support the knife blade 12. The said blade is herein shown as fastened by numerous screws to the under side of this bed plate, but it can obviously be secured to either side and in any way that is secure. The front portions of the terminal fixtures 8 are extended well forwardly from the flanges 9 toward or beyond the vertical plane of the edge of the knife blade in the form of arms 13 which are pinned at their forward ends to the links 14. The latter extend upward loosely through the lugs or flanges 15 formed on the side plates where they are provided with nuts 16 above the lugs and adapted to seat on the upper surfaces thereof and thus hold the bed-knife rigidly against dropping. A strong spring 17 is confined between the end of each fixture arm 13 and its associate frame lug and serves to press the bed-knife structure including the links downward, but only to such an extent as is permitted by the engagement of the nuts 16 with the lugs 15, and thereby prevent movement of the adjusting nuts which might otherwise occur through vibration of the bed-knife structure. When once in contact with the fly-knife, the bed-knife is held in contact therewith by the links. The adjustment of the single nut 16 on each side of the frame is thus all that is required to set the bed-knife blade exactly in proper cutting relation to the fly knife. The springs by preventing jarring and consequent movement of the adjusting nuts maintain the adjustment, the permanence of which is further insured by tightening the small nuts 16$^a$ above the nuts 16. The nuts 16 are made to occupy relatively high positions above the side plates and not between them as generally the case, and this further permits them to be made of liberal dimensions and correspondingly easy to manipulate. It is not necessary that the bed-knife structure be positively locked against upward movement because one or more of the blades of the cutter reel, which are always of helical curvature, will always be presented over the fixed knife so that any force, whether from adjustment or otherwise, tending to produce an undue upward displacement of the latter is thus adequately obstructed. Since, as above noted, the springs prevent jarring and rattling, while at the same time the bed-knife is rigidly supported against dropping away from the fly-knife by an adjustment which the springs maintain, there is on the one hand no need for the extra set of adjusting screws required in the rigid adjustment type of lawn mower bed-knife adjustment, and on the other no uncertainty of operation due to that entire absence of any definite adjustment which is characteristic of the type of lawn mower bed-knife adjustment in which the bed-knife structure is spring pressed toward the fly-knife and drops away therefrom whenever the force of the springs is insufficient to hold the bed-knife and fly-knife in engagement. The springs in the construction of this application do not have any adjusting functions. They merely maintain adjustment and are entirely automatic in action and are free from any possibility of derangement.

It may now be observed that the composite fabricated bed-knife structure of this invention may be composed of one or several longitudinal, united members resulting in an angular cross-section and providing a flat or straight knife bed and that the end fixtures may be variously shaped to support and combine such members into a composite assembled structure as well as to accommodate the shape of the side plates of the frame and the selected means of pivotal attachment thereto or to the cross rod member. In the present case these fixtures are simple castings, reverse duplicates of each other and the integral bracket flange 9 is braced to the holding arm by an integral web 18. It is preferred that the bed member 10 be a cut length of ordinary rolled angle-section with its two flanges relatively perpendicular and of about equal width, the upright flange, at least, being of considerable depth as indicated. Where such rolled shapes are assembled with simple casting terminal fixtures, the resulting structure, besides being light and stiff, is also absolutely free from tendency to warp which is a serious defect with bed structures formed of single castings, and they can be shipped from the factory without apprehension that the initial accuracy of the knife engagement will become impaired either by lapse of time or long continued service.

Claims:

1. A lawn mower comprising side frames, a fly knife, a bed-knife structure pivotally supported on the frame of the mower in rear of the fly-knife and having at each end an arm extending well forward toward or beyond the vertical plane of the edge of the bed-knife, a link extending upward from the end of each arm and passing loosely through a flange at the top of the side frame and having its upper end screw threaded, a nut adjustable on the screw threaded end of each link above said flange, and spring means resiliently urging the bed-knife away from the fly-knife and maintaining the nuts against the flanges, thereby holding the bed-knife rigidly from dropping away from the fly-knife and preventing derangement by jarring while permitting adjustment.

2. A lawn mower comprising side frames, a fly knife, a bed-knife structure pivotally supported on the frame of the mower in rear of the fly-knife and having at each end an arm extending well forward toward or beyond the vertical plane of the edge of the bed-knife, a link extending upward from the end of each arm and passing loosely through a flange at the top of the side frame and having its upper end screw threaded, a nut adjustable on the screw threaded end of each link above said flange, a jamb nut on the screw threaded end of each link above said nut, and a spring surrounding the link between the arm and the flange thrusting against both and thus resiliently urging the bed-knife away from the fly-knife and maintaining the nuts against the flanges, thereby holding the bed-knife rigidly from dropping away from the fly-knife and preventing derangement by jarring while permitting adjustment.

3. In a lawn mower, a frame comprising side plates having flanges, a fly-knife supported from the side-plates, a bed-knife structure pivoted in rear of the knife blade and having holder arms extended to one side of the pivot, bolts pivotally connected to the ends of the arms and passing loosely through the flanges, nuts on the bolts above the flanges adapted to elevate the knife blade, and springs thrusting the nuts against the flanges to eliminate the vibration of the said bolts and bed-knife structure.

4. In a lawn mower, the combination of the opposite side plates of the mower frame, a bed-knife structure between said plates comprising a bed member made of a rolled angle iron and two separately made terminal fixtures rigidly connected to the ends of said member and formed with means for attachment to the mower frame.

5. In a lawn mower, the combination of side plates and front and rear cross-members constituting the mower frame, a bed-knife structure pivotally supported on the frame and comprising separately made, united blade-bed and terminal members, the former being a rolled angle iron and the latter having forwardly extended holder arms, and means for adjustably supporting the same.

6. A lawn mower, according to claim 1, in which the bed-knife structure is constructed of separately made blade-bed and terminal members rigidly secured together and forming a composite rigid or non-warping bed-knife structure, and a bed-knife secured thereto.

In testimony whereof, I have signed this specification.

CHARLES C. WORTHINGTON.